United States Patent
Kamizono et al.

(10) Patent No.: US 8,887,823 B2
(45) Date of Patent: Nov. 18, 2014

(54) SURVEYING SYSTEM AND LASER REFERENCE PLANE SMOOTHING METHOD IN SURVEYING SYSTEM

(75) Inventors: Fumihiko Kamizono, Tokyo-to (JP); Kunihiro Hayashi, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 177 days.

(21) Appl. No.: 13/148,998

(22) PCT Filed: Apr. 11, 2011

(86) PCT No.: PCT/JP2011/059458
§ 371 (c)(1),
(2), (4) Date: Aug. 11, 2011

(87) PCT Pub. No.: WO2011/129454
PCT Pub. Date: Oct. 20, 2011

(65) Prior Publication Data
US 2012/0012350 A1 Jan. 19, 2012

(30) Foreign Application Priority Data
Apr. 15, 2010 (JP) ................... 2010-093863

(51) Int. Cl.
*E02F 3/76* (2006.01)
*E02F 3/84* (2006.01)
*G01C 15/00* (2006.01)

(52) U.S. Cl.
CPC .............. *G01C 15/004* (2013.01); *E02F 3/842* (2013.01); *E02F 3/847* (2013.01)
USPC ............................................ 172/4.5; 356/622

(58) Field of Classification Search
CPC .................................. E02F 3/847; E02F 3/842
USPC ...................................... 172/4, 4.5; 356/622
See application file for complete search history.

(56) References Cited

U.S. PATENT DOCUMENTS

| 4,818,107 A | 4/1989 | Ono et al. |
| 4,820,041 A * | 4/1989 | Davidson et al. ............ 356/3.12 |

(Continued)

FOREIGN PATENT DOCUMENTS

| EP | 1211484 A2 | 6/2002 |
| EP | 2230483 A1 | 9/2010 |

(Continued)

OTHER PUBLICATIONS

International Search Report dated May 24, 2011 in corresponding international patent application No. PCT/JP2011/059458.

(Continued)

*Primary Examiner* — Thomas B Will
*Assistant Examiner* — Joel F. Mitchell
(74) *Attorney, Agent, or Firm* — Nields, Lemack & Frame, LLC

(57) ABSTRACT

A surveying system comprises a plurality of rotary laser devices (1a, 1b), being installed at known points, for projecting laser beams (3a, 3b) in rotary irradiation and for forming laser reference planes (RPa, RPb) respectively, a photodetecting device (5), being installed on a movable support member (4), for receiving the laser beam and for detecting a height of each of the laser reference planes at their photodetecting position, a coordinate position measuring device (6) for detecting coordinate position of the support member, and a control device (7), wherein the rotary laser devices form the laser reference planes in such manner that at least a part of each effective range of the laser reference planes is overlapped on each other, the control device sets up a smoothing area within a range where the effective ranges are overlapped on each other, and in case the support member is judged to be within the smoothing area, based on a result of measurement by the coordinate position measuring device, the control device carries out smoothing processing of the laser reference plane continuously by the smoothing reference plane in the smoothing area based on the result of measurement by the coordinate position measuring device and also based on the result of detection by the photodetecting device.

8 Claims, 12 Drawing Sheets

(56) References Cited

U.S. PATENT DOCUMENTS

| | | | |
|---|---|---|---|
| 5,174,385 A * | 12/1992 | Shinbo et al. ................ 172/4.5 |
| 5,951,613 A * | 9/1999 | Sahm et al. .................... 701/50 |
| 6,286,607 B1 | 9/2001 | Ohtomo et al. |
| 6,324,455 B1 | 11/2001 | Jackson |
| 6,450,267 B2 | 9/2002 | Ohtomo et al. |
| 7,110,102 B2 | 9/2006 | Ohtomo et al. |
| 7,115,852 B2 | 10/2006 | Ohtomo et al. |
| 7,196,302 B2 | 3/2007 | Ohtomo et al. |
| 7,474,388 B2 | 1/2009 | Ohtomo et al. |
| 7,564,538 B2 | 7/2009 | Sakimura et al. |
| 7,633,609 B2 | 12/2009 | Ohtomo et al. |
| 7,764,365 B2 | 7/2010 | Nichols et al. |
| 7,966,739 B2 | 6/2011 | Kamizono et al. |
| 8,151,474 B2 | 4/2012 | Kumagai et al. |
| 2004/0125365 A1 | 7/2004 | Ohtomo et al. |
| 2005/0211882 A1 | 9/2005 | Ohtomo et al. |
| 2006/0181454 A1 | 8/2006 | Nichols |

FOREIGN PATENT DOCUMENTS

| | | |
|---|---|---|
| JP | 2001-208541 A | 8/2001 |
| JP | 2001-255146 A | 9/2001 |
| JP | 2004-212058 A | 7/2004 |
| JP | 2005-274229 A | 10/2005 |
| WO | 2008/052590 A1 | 5/2008 |

OTHER PUBLICATIONS

European Communication mailed Mar. 21, 2013 in corresponding European patent application No. 11741400.3.

European Communication mailed Jul. 26, 2010 in co-pending European patent application No. 10154434.4.

* cited by examiner

FIG.11A

TILTING OF LASER REFERENCE PLANES
AND RESULT OF WEIGHTED AVERAGING
WEIGHTED AVERAGING COEFFICIENT ①

— COMPENSATION HEIGHT
--- hb
-·- ha

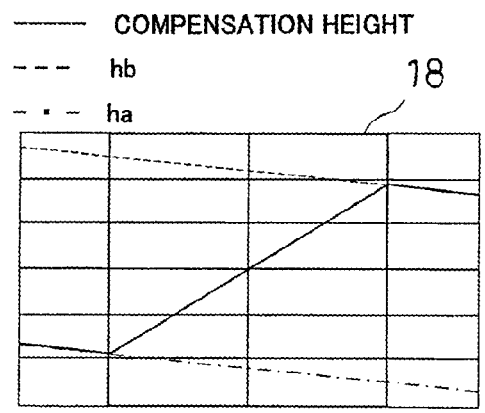

FIG.11B

TILTING OF LASER REFERENCE PLANES
AND RESULT OF WEIGHTED AVERAGING
WEIGHTED AVERAGING COEFFICIENT ②

— COMPENSATION HEIGHT
--- hb
-·- ha

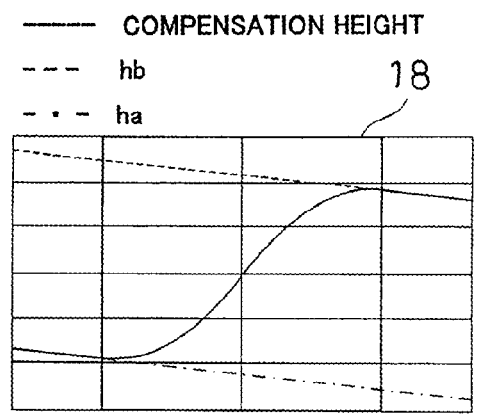

FIG.12A

TILTING OF LASER REFERENCE PLANES
AND RESULT OF WEIGHTED AVERAGING
WEIGHTED AVERAGING COEFFICIENT ①

— COMPENSATION HEIGHT
--- hb
-·- ha

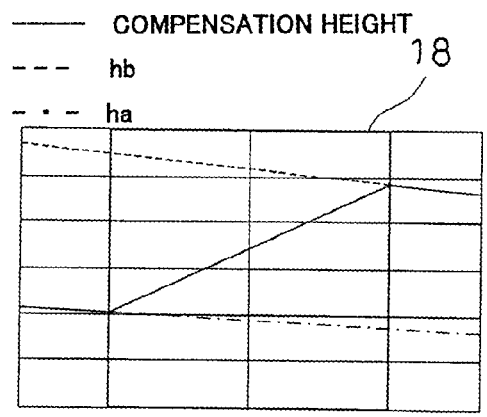

FIG.12B

TILTING OF LASER REFERENCE PLANES
AND RESULT OF WEIGHTED AVERAGING
WEIGHTED AVERAGING COEFFICIENT ②

— COMPENSATION HEIGHT
--- hb
-·- ha

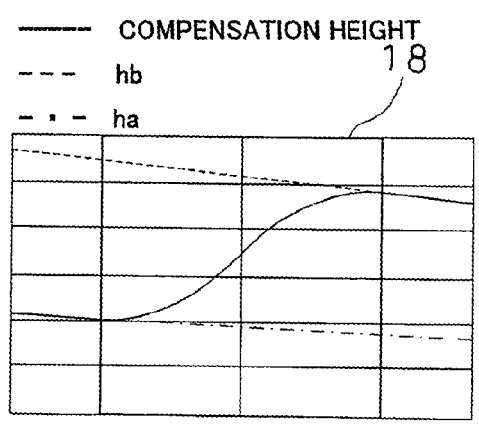

FIG.13A
TILTING OF LASER REFERENCE PLANES AND RESULT OF WEIGHTED AVERAGING
WEIGHTED AVERAGING COEFFICIENT ①

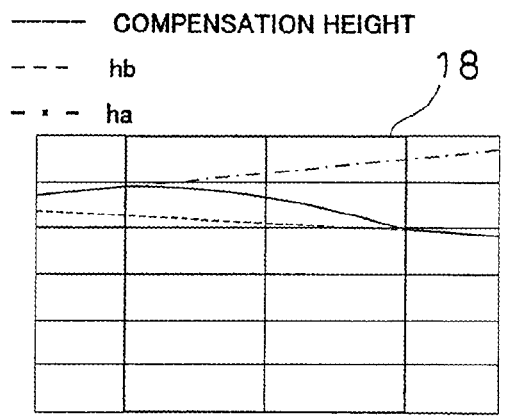

— COMPENSATION HEIGHT
- - - hb
- · - ha

FIG.13B
TILTING OF LASER REFERENCE PLANES AND RESULT OF WEIGHTED AVERAGING
WEIGHTED AVERAGING COEFFICIENT ②

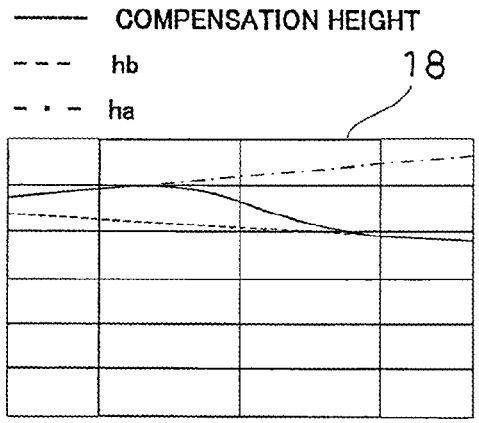

— COMPENSATION HEIGHT
- - - hb
- · - ha

FIG.14A
TILTING OF LASER REFERENCE PLANES AND RESULT OF WEIGHTED AVERAGING
WEIGHTED AVERAGING COEFFICIENT ①

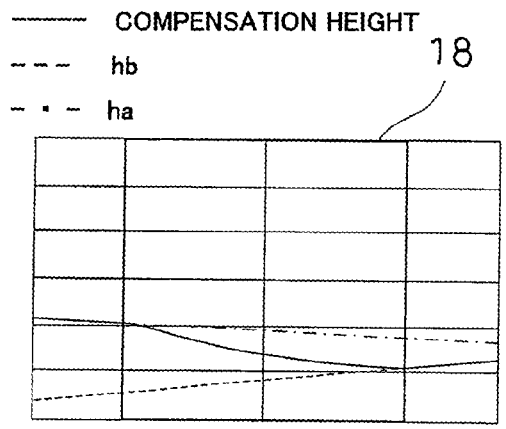

— COMPENSATION HEIGHT
- - - hb
- · - ha

FIG.14B
TILTING OF LASER REFERENCE PLANES AND RESULT OF WEIGHTED AVERAGING
WEIGHTED AVERAGING COEFFICIENT ②

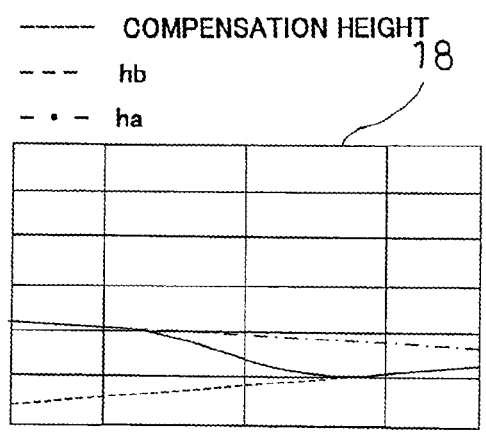

— COMPENSATION HEIGHT
- - - hb
- · - ha

FIG.15A

TILTING OF LASER REFERENCE PLANES
AND RESULT OF WEIGHTED AVERAGING
WEIGHTED AVERAGING COEFFICIENT ①

------ COMPENSATION HEIGHT
--- hb
-·- ha

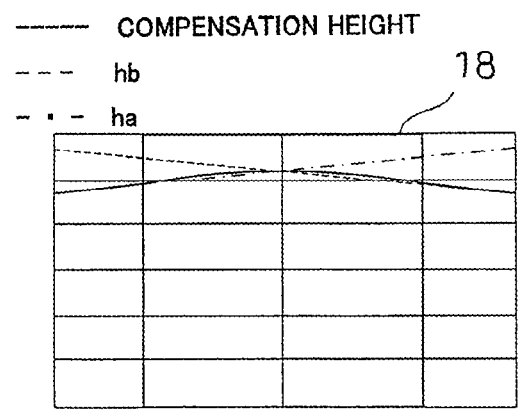

FIG.15B

TILTING OF LASER REFERENCE PLANES
AND RESULT OF WEIGHTED AVERAGING
WEIGHTED AVERAGING COEFFICIENT ②

------ COMPENSATION HEIGHT
--- hb
-·- ha

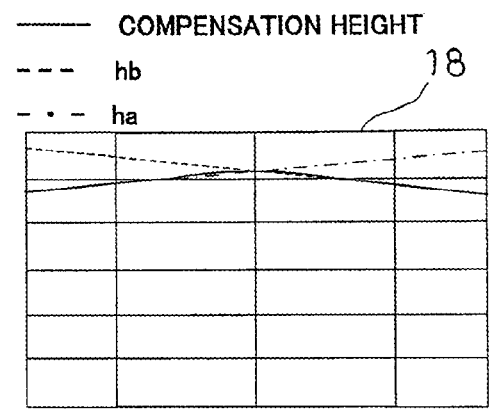

FIG.16A

TILTING OF LASER REFERENCE PLANES
AND RESULT OF WEIGHTED AVERAGING
WEIGHTED AVERAGING COEFFICIENT ①

------ COMPENSATION HEIGHT
--- hb
-·- ha

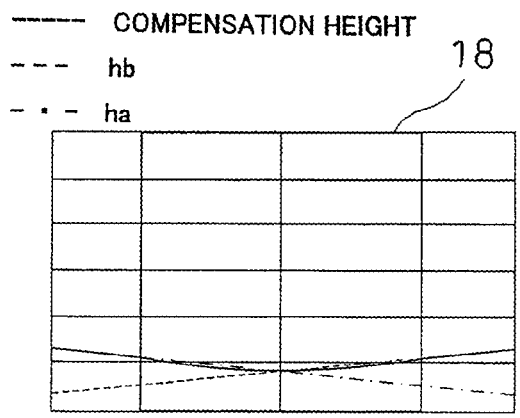

FIG.16B

TILTING OF LASER REFERENCE PLANES
AND RESULT OF WEIGHTED AVERAGING
WEIGHTED AVERAGING COEFFICIENT ②

------ COMPENSATION HEIGHT
--- hb
-·- ha

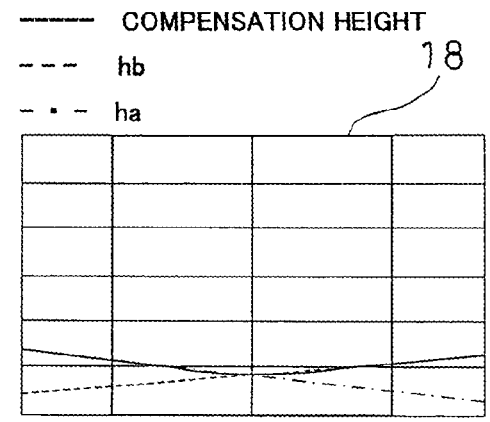

SURVEYING SYSTEM AND LASER REFERENCE PLANE SMOOTHING METHOD IN SURVEYING SYSTEM

TECHNICAL FIELD

The present invention relates to a surveying system for projecting a laser beam in rotary irradiation by using a rotary laser device and for forming a laser reference plane. In particular, the invention relates to a surveying system for forming two or more laser reference planes and also to a laser reference plane smoothing method in the surveying system.

BACKGROUND ART

As a device to form a reference plane in wide range, a rotary laser device has been known, which is used to project a laser beam in rotary irradiation. A surveying system has been known, where a photodetector is installed on a working machine, and civil engineering operation such as ground leveling is carried out by detecting the laser reference planes by the photodetector.

In the working operation by using the working machine, e.g. in the ground leveling operation using the working machine such as a bulldozer, a working area may be extended to a wider area, and the working area may not be covered by the reference plane, which is formed by a single rotary laser device. In such case, the laser reference planes are formed in wider range by using two or three or even more rotary laser devices.

In case a plurality of the laser reference planes are formed by using a plurality of rotary laser devices, a portion where the laser reference planes are overlapped on each other may not necessarily be overlapped on the same plane because of individual difference of each rotary laser device and also because of the influence from environmental changes, such as temperature changes, etc.

Further, when the rotary laser devices are installed and the photodetectors are disposed on the working machine, and also when civil engineering work is carried out based on the laser reference planes, it may take relatively long time, e.g. from morning to the evening. Also, air temperature change may vary widely, and the rotary laser device may be influenced by the air temperature change. For instance, changes may occur in projecting direction of the laser beams in case where rotation axis of the rotating mechanism is tilted due to temperature change or in other cases. Further, posture of installation of the rotary laser device may be changed due to vibration, etc. These changes appear as time-varying positional changes of the laser reference planes. As a result, the laser reference plane, which should be originally horizontal, may have tilting components.

Therefore, positional deviation is caused in height direction between a plurality of laser reference planes. When the laser reference planes, which are used as the reference for the operation, are changed, a bump may occur. It is not desirable to form the bump at a position, which should be originally in form of a plane. In the past, operation has been performed to smoothen and make the bump even according to an operator's judgement.

To solve the above problems, it is an object of the present invention to provide a surveying system and a laser reference plane smoothing method in a surveying system, by which it is possible to eliminate the bump at a portion of border between the laser reference planes when a plurality of laser reference planes are formed.

PRIOR ART REFERENCES

[Patent Document 1] JP-A-2004-212058
[Patent Document 2] JP-A-2005-274229

DISCLOSURE OF THE INVENTION

The present invention relates to a surveying system, comprising a plurality of rotary laser devices, being installed at known points, for projecting a laser beam in rotary irradiation and for forming a laser reference plane respectively, a photodetecting device, being installed on a movable support member, for receiving the laser beam and for detecting a height of each of the laser reference planes at their photodetecting position, a coordinate position measuring device for detecting coordinate position of the support member, and a control device, wherein the rotary laser devices form the laser reference planes in such manner that at least a part of each effective range of the laser reference planes is overlapped on each other, the control device sets up a smoothing area within a range where the effective ranges are overlapped on each other, and in case the support member is judged to be within the smoothing area, based on a result of measurement by the coordinate position measuring device, the control device carries out smoothing processing of the laser reference plane continuously by the smoothing reference plane in the smoothing area based on the result of measurement by the coordinate position measuring device and also based on the result of detection by the photodetecting device.

Further, the present invention relates to the surveying system, wherein the plurality of rotary laser devices project the laser beams identifiable from each other in rotary irradiation, and the photodetecting device can identify the laser beams individually.

Further, the present invention relates to the surveying system, wherein the support member has a working implement in a known relation with the photodetecting device, and the control device controls a height of the working implement based on a result of the smoothing processing.

Further, the present invention relates to the surveying system, wherein the control device calculates a deviation in height direction between the laser reference planes based on the result of detection by the photodetecting device, calculates a position of the support member within the smoothing area based on the result of measurement by the coordinate position measuring device, and calculates at real time the smoothing reference plane or the smoothing reference position after the smoothing processing based on the calculated deviation of the height direction and also based on the calculated position within the smoothing area.

Further, the present invention relates to the surveying system, wherein the control device calculates at real time the smoothing reference plane or the smoothing reference position by weighted averaging based on the deviation in height direction between the laser reference planes and also based on the position of the support member within the smoothing area.

Further, the present invention relates to the surveying system, wherein a weighted averaging coefficient is included by giving consideration on smoothness in the calculation of the smoothing reference plane or the smoothing reference position of the control device.

Further, the present invention relates to the surveying system, wherein, in the rotary laser device, total range where at least two of the laser reference planes are overlapped is within an effective range of each of the laser reference planes.

Furthermore, the invention relates to a laser reference plane smoothing method in a surveying system, comprising a step of forming a plurality of laser reference planes and of overlapping at least a part of effective range of the laser reference planes, a step of setting a smoothing area within the overlapped range, a step of detecting the laser reference planes respectively in the smoothing area and of obtaining a deviation in height between the laser reference planes, a step of detecting a coordinate position where light beams are detected within overlapped range, and a step of smoothly continuing the laser reference planes within the smoothing area based on the obtained deviation of height and on the detected coordinate position.

BRIEF DESCRIPTION OF THE DRAWINGS

FIG. 11 (A) and FIG. 11 (B) each represents a graph to show condition of tilting between the laser reference planes and a graph to show conditions of smoothing processing in case the weighted averaging coefficient is changed;

FIG. 12 (A) and FIG. 12 (B) each represents a graph to show condition of tilting between the laser reference planes and a graph to show conditions of smoothing processing in case the weighted averaging coefficient is changed;

FIG. 13 (A) and FIG. 13 (B) each represents a graph to show condition of tilting between the laser reference planes and a graph to show conditions of smoothing processing in case the weighted averaging coefficient is changed;

FIG. 14 (A) and FIG. 14 (B) each represents a graph to show condition of tilting between the laser reference planes and a graph to show conditions of smoothing processing in case the weighted averaging coefficient is changed;

FIG. 15 (A) and FIG. 15 (B) each represents a graph to show condition of tilting between the laser reference planes and a graph to show conditions of smoothing processing in case the weighted averaging coefficient is changed; and FIG. 16 (A) and FIG. 16 (B) each represents a graph to show condition of tilting between the laser reference planes and a graph to show conditions of smoothing processing in case the weighted averaging coefficient is changed.

LEGEND OF REFERENCE NUMERALS

Figure 1:
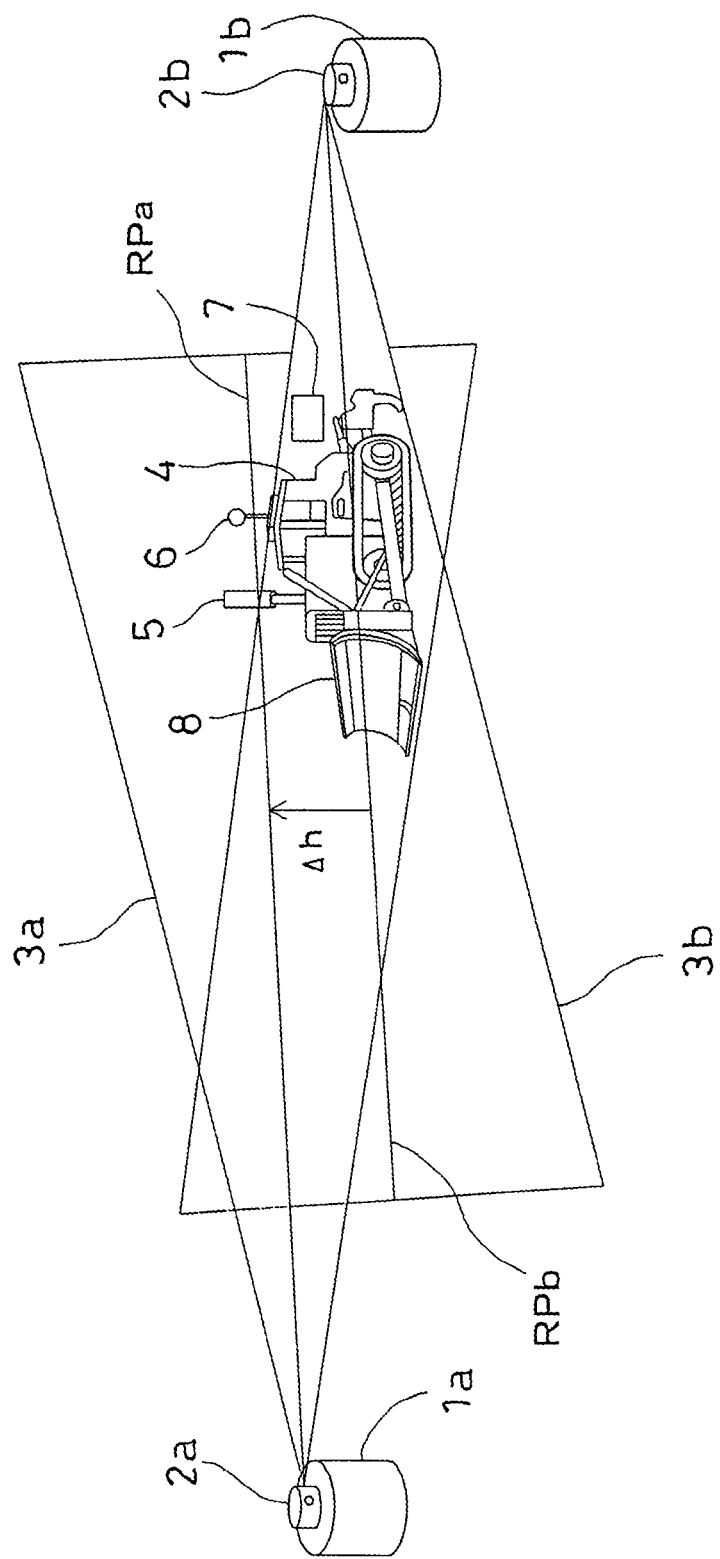
FIG. 1 is a schematical drawing to show general features of an embodiment according to the present invention.

1 Rotary laser device
2 Rotator
3 Laser beam
4 Bulldozer
5 Photodetecting device
6 GPS position measuring device
7 Control device
8 Blade
11 Arithmetic control unit
12 Storage unit
13 Driving control unit
14 Driving unit
15 Operation/input unit
17 Working area
18 Smoothing area
19 Reference plane
20 Smoothing reference curve

BEST MODE FOR CARRYING OUT THE INVENTION

Description will be given below on embodiments of the present invention by referring to the attached drawings.

First, referring to FIG. 1, description will be given on general features of an embodiment of the present invention. Number of rotary laser devices to be installed is determined according to the working range. In the present embodiment, an example is given on a case where two laser reference planes RPa and RPb are formed by using two rotary laser devices 1a and 1b respectively, each installed at a known position. Each of the rotary laser devices 1a and 1b projects a laser beam 3a and a laser beam 3b respectively in rotary irradiation at a constant speed. The rotary projection of the laser beams may be synchronized or may not be synchronized. A luminous flux of the projected laser beam may be a spot light or a fan-shaped light spread in vertical direction or may be a composite fan-shaped light, which is made up with two or more fan-shaped beams with spreading and at least one of the fan-shaped beams being tilted.

In FIG. 1, reference symbols 2a and 2b each represents a rotator of the rotary laser devices 1a and 1b respectively, and the laser beams 3a and 3b are projected in rotary irradiation from the rotators 2a and 2b respectively. Reference numeral 4 represents a bulldozer, which is one of working machine. On the bulldozer 4, a photodetecting device 5, a GPS position measuring device 6, and a control device 7 are provided. Therefore, the bulldozer 4 is a working machine, and at the same time, is a mobile object, and is a support member to support the photodetecting device 5 and the GPS position measuring device 6.

The laser beams 3a and 3b projected from the rotary laser devices 1a and 1b respectively can be identified from each other. For instance, the laser beams 3a and 3b have wavelengths different from each other or are different in modulation. The photodetecting device 5 has a function to receive and detect the laser beams 3a and 3b respectively and a function to identify these two laser beams, and the photodetecting device 5 detects a photodetecting position (photodetecting height) of each of the laser beams 3a and 3b.

As functions to identify and discriminate the two laser beams from each other: a function, having a single photodetecting unit (not shown), to identify the laser beams 3a and 3b from each other by electrically processing the photodetecting signals from the photodetecting unit, or a function, having as many photodetecting units as to match the number of the laser beams, to separately identify the laser beams 3a and 3b respectively by the photodetecting units, and other functions.

The GPS position measuring device 6 is a device to measure absolute coordinates of the bulldozer 4 on ground surface. The GPS position measuring device 6 and the photodetecting device 5 are in a known relationship to each other. When a position of the GPS position measuring device 6 is measured, absolute coordinates of the photodetecting device 5 can be determined. Also, the position of the bulldozer 4 may be measured by using position measuring means such as a total station instead of the GPS position measuring device 6.

The control device 7 is provided with working data so that a position in a vertical direction of a blade 8, i.e. a working implement, is controlled based on the result of detection of the laser beam reference plane determined by the photodetecting device 5, and also based on the result of measurement of the absolute coordinates from the GPS position measuring device 6 and also based on the working data. Based on the result of measurement by the GPS position measuring device 6, the control device 7 determines which of the laser reference plane RPa or the laser reference plane RPb should be used. As to be described later, when the use of the laser reference plane RPa and the laser reference plane RPb are changed over, and if there is a bump (i.e. a deviation in vertical direction) between the laser reference plane RPa and the laser reference plane RPb, smoothing processing (smoothing) is carried out so that no bump occurs.

Figure 2:
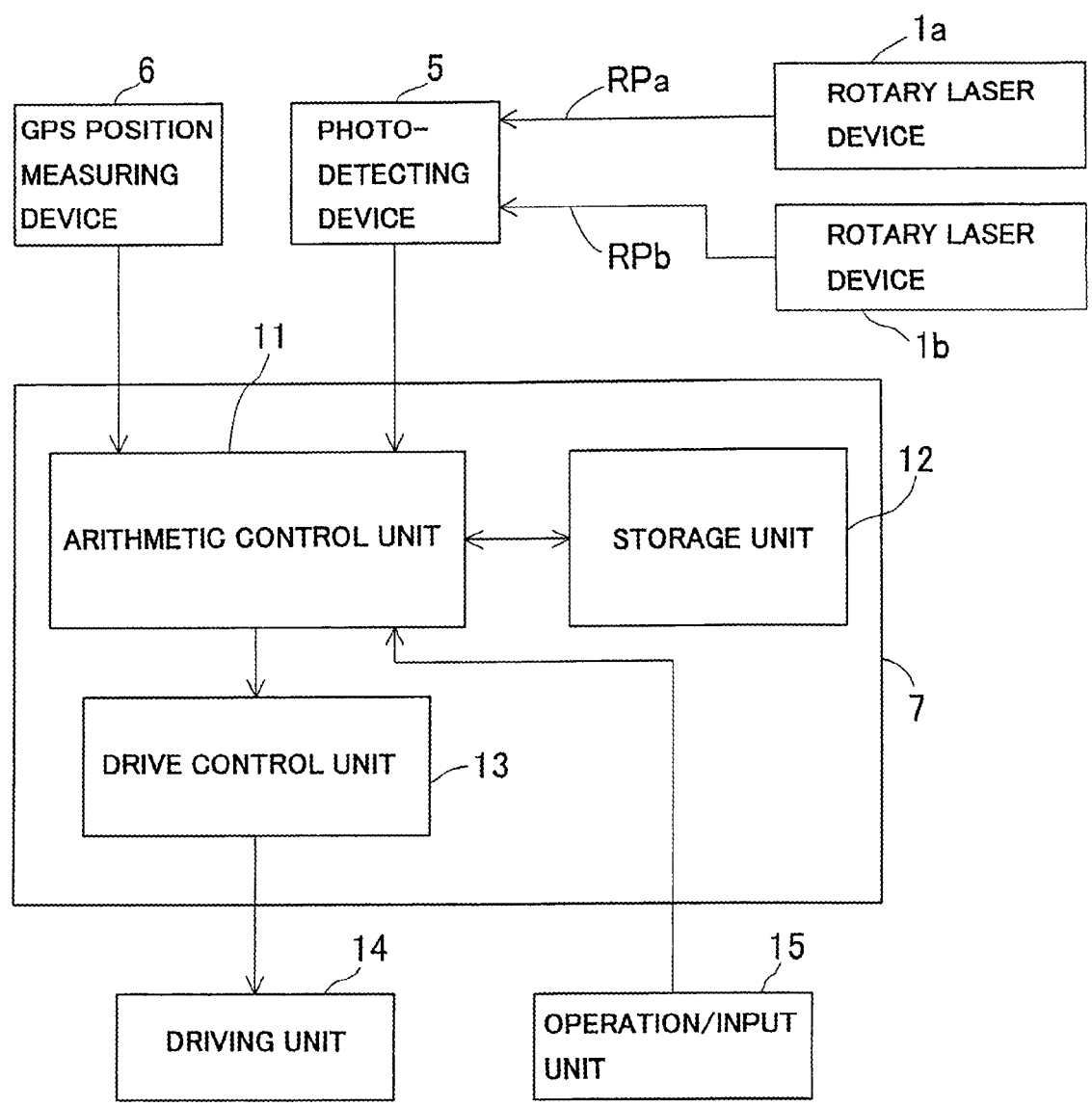
FIG. 2 is a schematical block diagram of the embodiment according to the present invention.

Now, referring to FIG. 2, description will be given on general features of the present embodiment.

The laser reference plane RPa and the laser reference plane RPb as obtained by the rotary laser devices 1a and 1b respectively are detected by the photodetecting device 5, and detection result is inputted to the control device 7. Absolute coordinates (coordinate position information) as measured by the GPS position measuring device 6 are inputted to the control device 7.

The control device 7 primarily comprises an arithmetic control unit 11, a storage unit 12, and a drive control unit 13. The drive control unit 13 drives a driving unit 14, which drives the blade 8 according to an instruction from the arithmetic control unit 11, and controls the driving operation. Data such as setting of working condition are inputted to the arithmetic control unit 11 from an operation/input unit 15. Although not shown in the figure, the operation/input unit 15 has a display unit, and the data such as: setting information when the data are inputted, working conditions when working operation is carried out, working data, etc. are displayed on the display unit.

In the storage unit 12, various types of programs are stored. These programs include, for instance: a smoothing area setting program for calculating a smoothing area from position information of the rotary laser devices 1a and 1b, and from amount of deviation between the laser reference plane RPa and the laser reference plane RPb, a smoothing program for calculating a smoothing reference curve (or a smoothing reference curved surface) to connect the laser reference plane RPa and the laser reference plane RPb in the smoothing area and for calculating a height position (a reference position after smoothing) to match the position of the photodetecting device 5 in a smoothing reference curve (or a smoothing reference curved surface) at real time, a position calculating program for calculating relative position of the photodetecting device 5 on the laser reference plane RPa and the laser reference plane RPb, i.e. a relative position of the bulldozer 4, based on positional information from the GPS position measuring device 6 and on positional information of the rotary laser devices 1a and 1b, and a control program for driving the driving unit 14, and other programs. Also, the working data, positional information of each of the rotary laser devices 1a and 1b, coordinate position information determined by the GPS position measuring device 6, and other data are stored in the storage unit 12.

Next, referring to FIG. 3 to FIG. 7, description will be given below on operation in the present embodiment.

Figure 3:
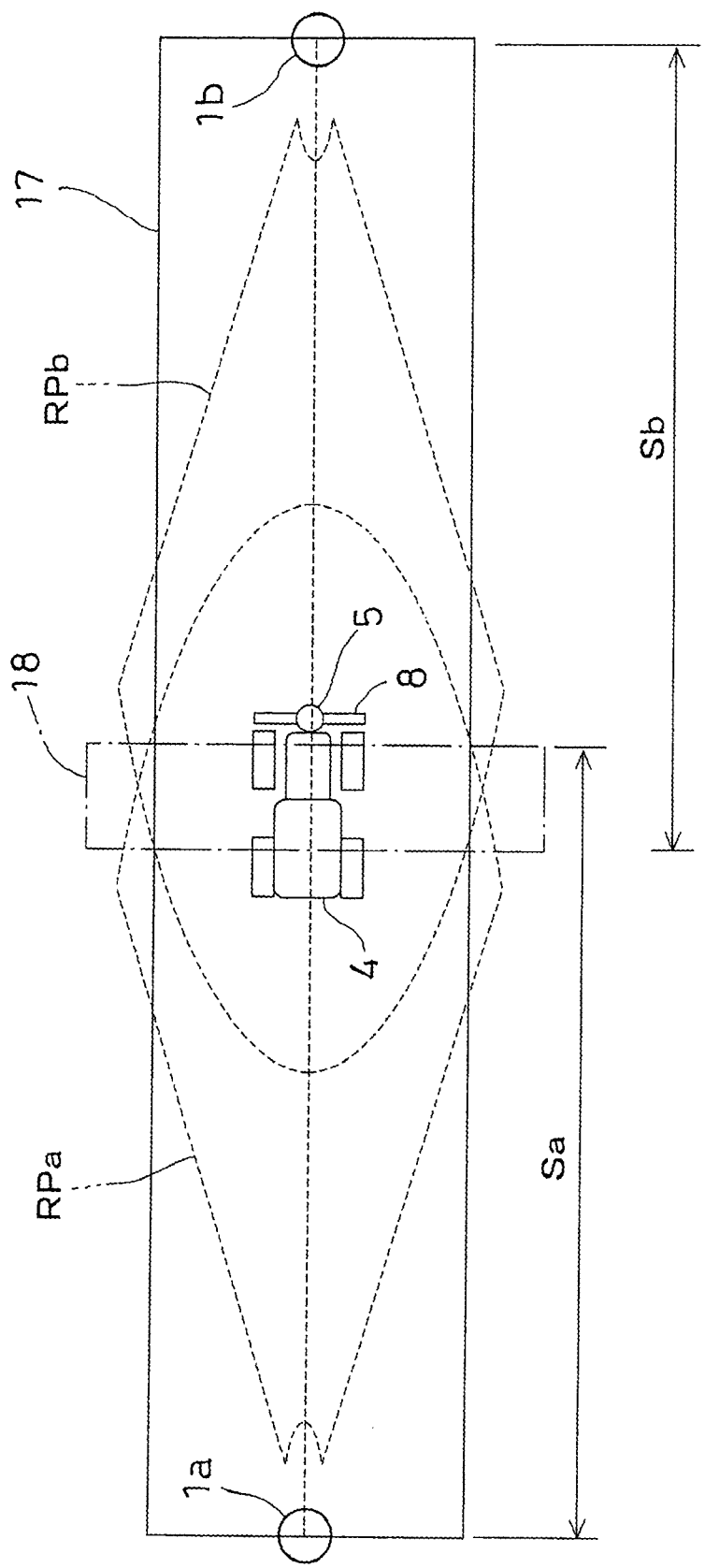
FIG. 3 is a plan view to show relationship of a rotary laser device, a bulldozer, a photodetecting device, and a laser reference plane.

FIG. 3 is a plan view to show relationship of the rotary laser devices 1a and 1b, the bulldozer 4, the photodetecting device 5, the laser reference plane RPa, and the laser reference plane RPb with each other. In the figure, reference numeral 17 denotes a working area. The laser reference plane RPa and the laser reference plane RPb are overlapped on each other within a predetermined range. Also, a range Sa where the laser reference plane RPa can be used by the rotary laser device 1a (i.e. an effective range of the laser reference plane RPa), and a range Sb where the laser reference plane RPa can be used by the rotary laser device 1b (i.e. an effective range of the laser reference plane RPb) are also overlapped on each other. All or a part of the range where the range Sa and the range Sb are overlapped on each other is set as a smoothing area 18.

The smoothing area 18 may be automatically set by the arithmetic control unit 11 according to the smoothing area setting program based on positions of the rotary laser devices 1a and 1b and also based on the range where the laser reference plane RPa and the laser reference plane RPb can be used. Further, the arithmetic control unit 11 sets the smoothing area 18 automatically, by adding the setting of smoothness, through the setting of smooth surface as expected by the operation/input unit 15. Or, a working operator may input the smoothing range from the operation/input unit 15 and the arithmetic control unit 11 may set the smoothing area 18 based on the data which the working operator inputted.

Figure 4:
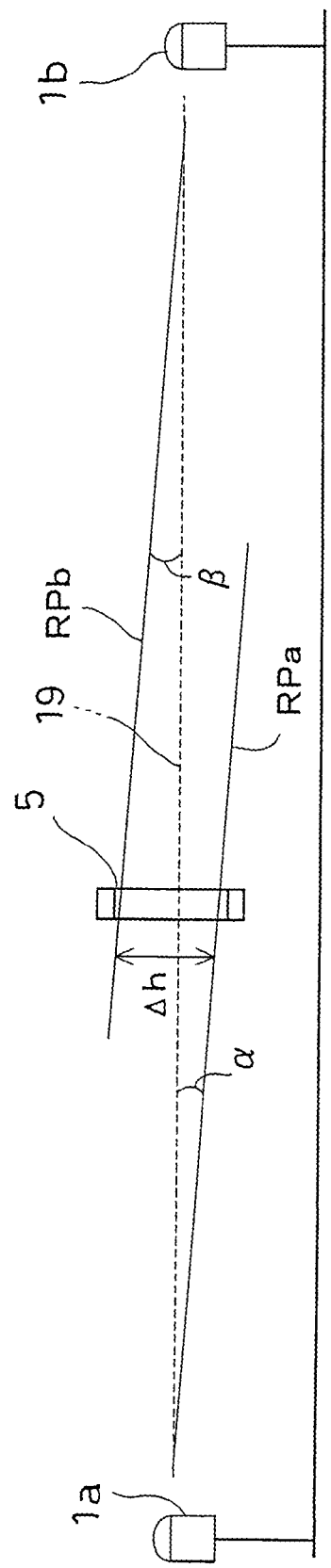
FIG. 4 is an elevation view to show relationship of the rotary laser device, the photodetecting device, and the laser reference plane.

FIG. 4 is an elevation view to show a relationship of the rotary laser devices 1a and 1b, the photodetecting device 5, and the laser reference planes RPa, and the laser reference plane RPb with each other. In FIG. 4, reference numeral 19 represents an ideal reference plane. However, the rotary laser devices 1a and 1b are influenced by individual difference of machine, temperature range, vibration, etc. As a result, the laser reference plane RPa and the laser reference plane RPb are not necessarily concur with the ideal reference plane 19, and the laser reference plane RPa and the laser reference plane RPb are tilted at angles of $\alpha$ and $\beta$ with respect to the ideal reference plane 19. Therefore, a deviation of $\Delta h$ is caused in vertical direction between the laser reference plane RPa and the laser reference plane RPb.

Figure 5:
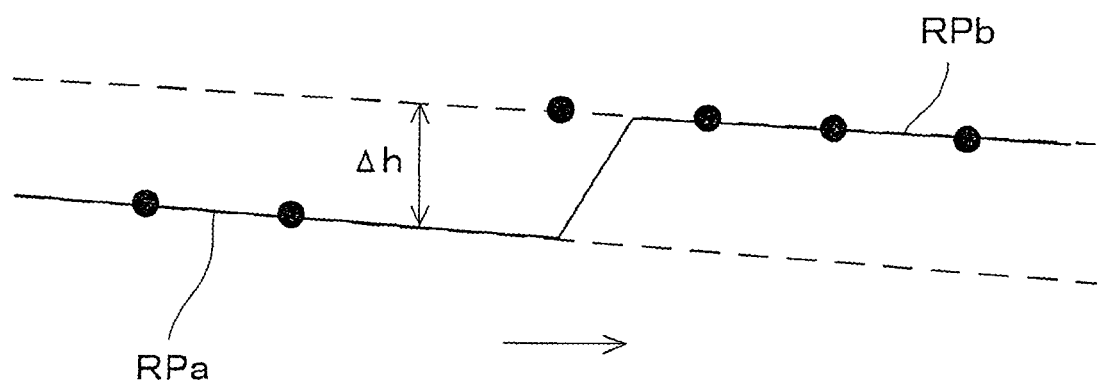
FIG. 5 is a schematical drawing to explain a bump, which is caused when the laser reference plane is changed over.

When ground leveling operation is carried out by using the laser reference plane RPa and the laser reference plane RPb as reference planes, and when the reference plane is changed over from the laser reference plane RPa to the laser reference plane RPb, if smoothing processing is not performed, a bump (due to mismatch) is formed on a portion where the reference plane has been changed over as shown in FIG. 5. The bump has a tilting as shown in FIG. 5 because the driving unit 14 of the blade 8 has a time-lag in driving. In FIG. 5, each of black circles (spots) indicates that the photodetecting device 5 has received (detected) the laser beams 3a and 3b, and an interval between the black circles indicates a rotation cycle of the laser beams 3a and 3b.

Figure 6:
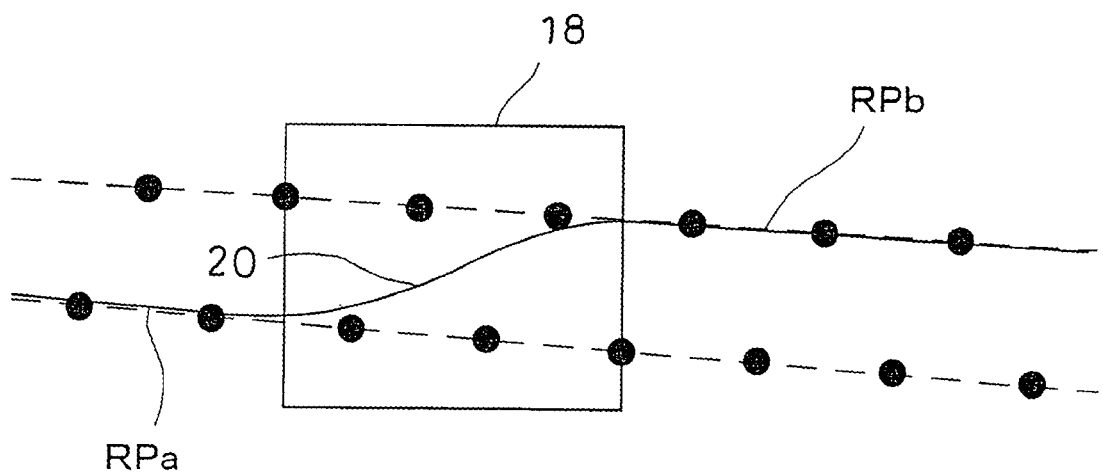
FIG. 6 is a schematical drawing to show a case where smoothing is performed on a bump, which is caused when the laser reference plane is changed over.

In the present embodiment, as shown in FIG. 6, the laser reference plane RPa and the laser reference lane RPb are smoothly connected via a smoothing reference plane 20 over total range of the smoothing area 18 based on height position information of both of the laser reference plane RPa and the laser reference plane RPb in the smoothing area 18. In FIG. 6, each of the black circles (spots) indicates that the photodetecting device 5 has received (detected) the laser beams 3a and 3b as in the case shown in FIG. 5. When the bulldozer 4 moves linearly in the directions of the rotary laser devices 1a and 1b, the smoothing reference plane 20 appears as a curve (smoothing reference curve).

Figure 7:
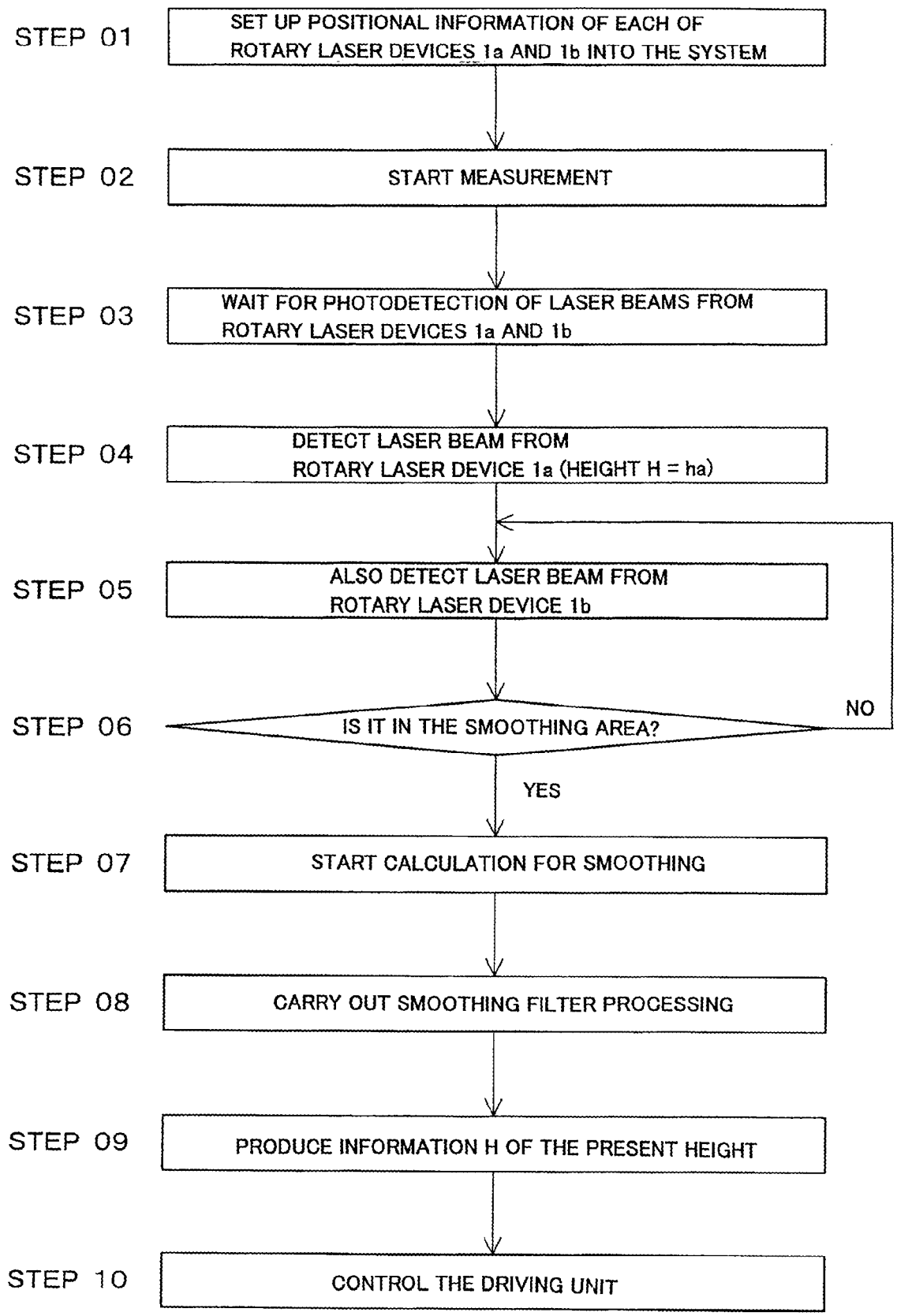
FIG. 7 is a flow chart to explain operation of an embodiment according to the present invention.

FIG. 7 is a flowchart to show a basic sequence of operations in the present embodiment.

Data of positional information of each of the rotary laser devices 1a and 1b are set and inputted to the control device 7 by the operation/input unit 15 (Step 01).

The measurement is started (Step 02), and the bulldozer 4 starts the operation. It is assumed here that the bulldozer 4 is moved from the range Sa to the range Sb.

When a light beam of one of the laser beams 3a or 3b of the rotary laser devices 1a or 1b is received (Step 03 and Step 04), for instance, when it is supposed that the laser beam 3a is received, it is judged whether the laser beam 3b has been detected (received) or not. In case the light is not detected, a height information H is produced based on the photodetecting of the laser beam 3a (Step 09), and the driving unit 14 is controlled based on the height information H (Step 10).

When the laser beam 3b is also detected, it is judged whether the photodetecting device 5, i.e. the bulldozer 4, is within the smoothing area 18 or not according to coordinate position information from the GPS position measuring device 6 (Step 05 and Step 06). Until the bulldozer 4 reaches the smoothing area 18, the height information H is produced based on the result of photodetection of the laser beam 3a.

When the laser beams 3a and 3b have been received and detected, and when it is judged that the bulldozer 4 has reached the smoothing area 18, a calculation of the smoothing is started (Step 07). For the purpose of obtaining the smoothness by calculation of the smoothing, a smoothing filter processing may be carried out (Step 08).

In the calculation of smoothing, the photodetecting device 5 detects the light of the laser reference plane RPa and the laser reference plane RPb. Based on the height position of the laser reference plane RPa and the laser reference plane RPb as detected, and also based on the positional information of the bulldozer 4 as determined by the GPS measuring device 6, present height information H is calculated to shift smoothly from the laser reference plane RPa to the laser reference plane RPb (Step 09). The height information H is outputted to the driving control unit 13, and the driving control unit 13 controls the driving unit 14 (Step 10).

Specifically, based on a height position of each of the laser reference plane RPa and the laser reference plane RPb as detected at the present moment and based on a coordinate position as measured by the GPS position measuring device 6, a height position within the smoothing area 18 is calculated. Therefore, the smoothing processing is carried out in coordination of the ground leveling conditions of the current moment even when the rotary laser devices 1a and 1b may be changed in elapse of time, and positions of the laser reference plane RPa and the laser reference plane RPb are changed.

When the height information H thus calculated and acquired is arranged in time series and so as to match the coordinate position as obtained from the GPS position measuring device 6, a smoothing reference curve 20 as shown in FIG. 6 is produced. That is, the height position is calculated so that the height position concurs with the smoothing reference curve 20, and the smoothing reference curve 20 is incorporated in the smoothing program so that the smoothing reference curve 20 matches the expected smoothness of the smoothing surface.

Further, by referring to FIG. 8 to FIG. 11, description will be given below on the smoothing processing.

In the smoothing processing as described below, an explanation will be made on a case where the smoothing reference curve 20 is determined in such manner that an weighted averaging is carried out with respect to two height positional information which are acquired in detections of the laser reference plane RPa and the laser reference plane RPb, by giving due consideration on coordinate position information as acquired by the GPS position measuring device 6.

Figure 8:
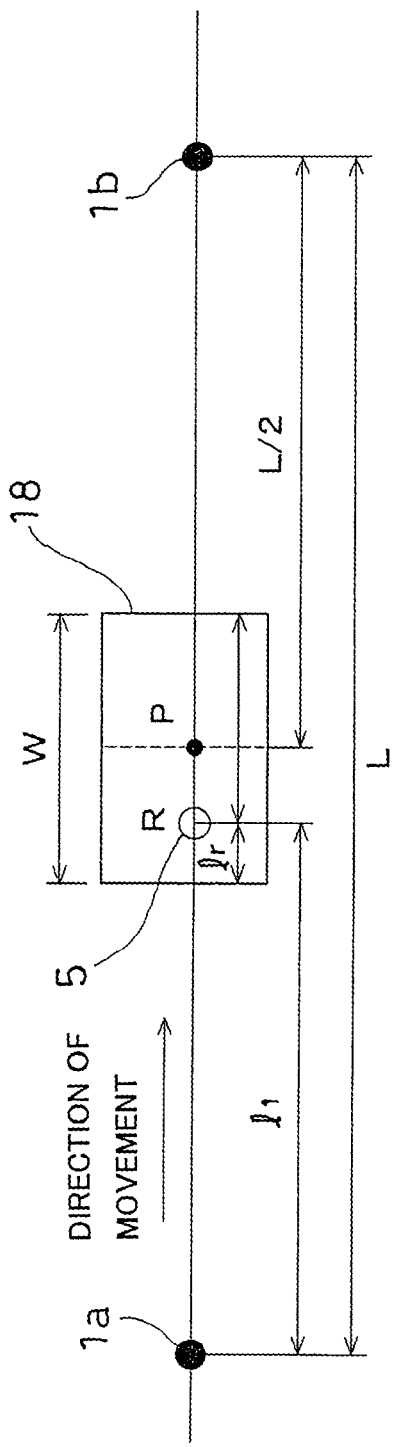
FIG. 8 is a schematical drawing to explain an example of the smoothing processing.

In FIG. 8, when it is supposed that a distance between the rotary laser devices 1a and 1b is L, a point P of the center of the smoothing area 18 is reasonably determined as a middle point of these two rotary laser devices, i.e. L/2.

In width W with the point P as the center, consideration is now given on the smoothing processing in the smoothing area 18. A position of the photodetecting device 5 is indicated by a point R.

When the photodetecting device 5 is located at a point R, which is at a position with a distance $l_1$ from the rotary laser device 1a, a position lr, i.e. a distance of R from the border of the smoothing area 18, is given as follows:

$$lr = l_1 - (L-W)/2$$

Then, positional relation at the smoothing area 18 as seen from a side of the rotary laser device 1a can be given as: lr/W.

Figure 9A:
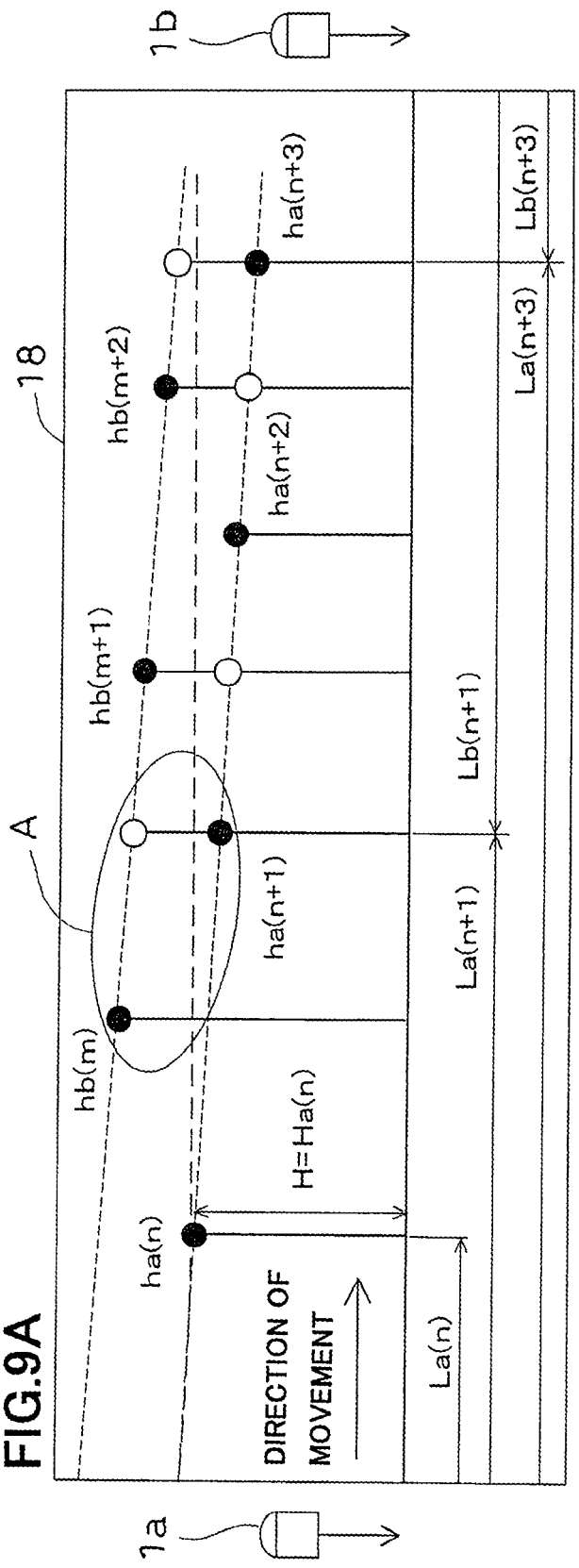
FIG. 9 (A) is a schematical drawing to explain an example of smoothing processing, and FIG. 9 (B) is an enlarged view of a portion A in FIG. 9 (A)
Figure 9B:
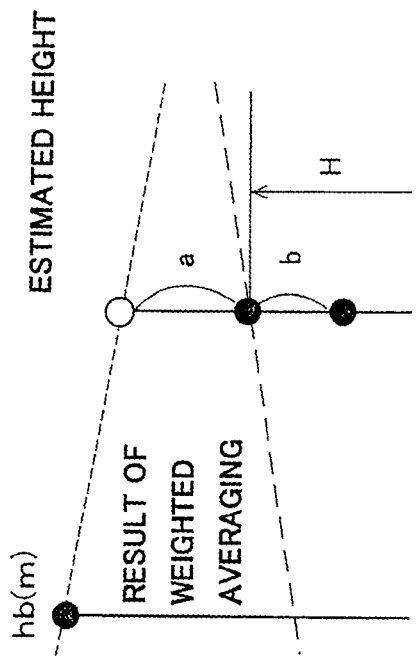

Here, if it is supposed that a height determined from the laser reference plane RPa is ha, and that a height determined from the laser reference plane RPb is hb, a height obtained by calculation (hereinafter referred as "calculated height position h") (see FIG. 9) is given as described below. In FIG. 9, each of black circles indicates a position of the laser reference plane RPa or the laser reference plane RPb where the photodetecting device 5 detects the laser beams 3a and 3b respectively, and each of white circles indicates a position estimated from the result before the detection.

When ha<hb, $$h = ha + |ha - hb| \times A$$

This indicates a weighted averaging coefficient where A=F (lr/W).

When ha=hb, $$h = ha$$

When ha>hb, $$h = hb + |ha - hb| \times B$$

This indicates a weighted averaging coefficient obtained from B=F (1-lr/W).

In the following, it is supposed that a symbol x represents a ratio to indicate positional relation within the smoothing area 18, and a function F(x) where the weighted averaging coefficient is included is set up, and smoothness of the smoothing reference plane 20 is determined. Several examples of the function F(x) are given below:

Weighted averaging coefficient (1)

$$F(x) = x$$

Weighted averaging coefficient (2)
When $x \leq 0.5$, $F(x) = 2 \times x^2$
When $x > 0.5$, $F(x) = 1 - 2 \times (1-x)^2$
Weighted averaging coefficient (3)
When $x \leq 0.5$, $F(x) = x^2 + x/2$
When $x > 0.5$:

$$F(x) = 1/2 \times [x + \{1 - 2 \times (1-x)^2\}]$$

Figure 10:
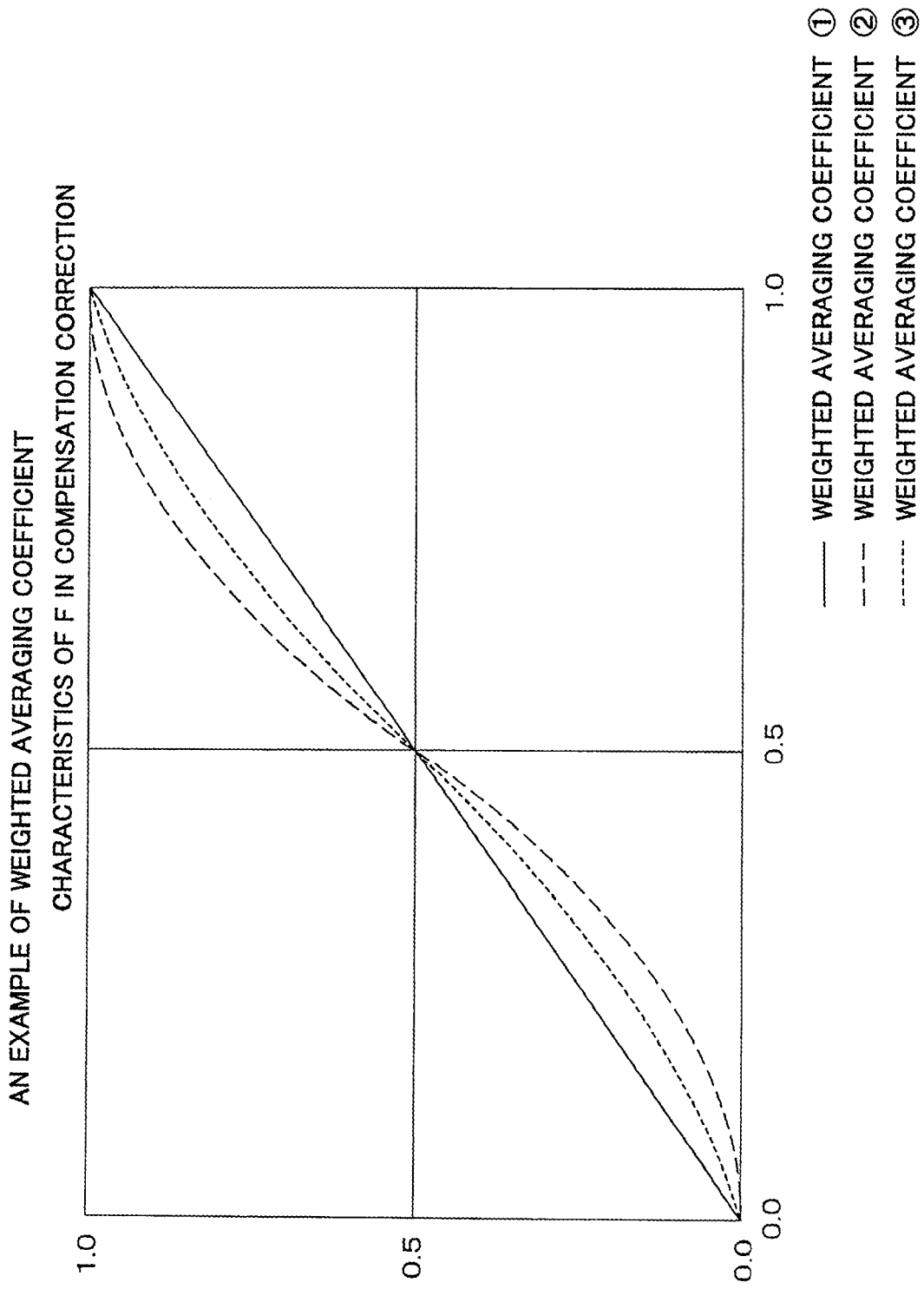
FIG. 10 is a graphic representation to show smoothness when smoothing processing is performed by giving due consideration on a weighted averaging coefficient.

FIG. 10 shows properties of the function F(x) when the smoothing reference curve 20 is calculated by using the function F(x).

As it is evident from the compensation examples shown in the figures, when a difference of heights (ha and hb) between each of the laser reference planes RPa, RPb is comparatively big, natural linking continuation can be accomplished in more persuasible manner in case of using the weighted averaging coefficient (1) than in case of the weighted averaging coefficient (2). On the contrary, when the difference of heights is comparatively small, natural linking continuation can be accomplished in more persuasible manner in case of using the weighted averaging coefficient (2). Also, as shown in the case of the weighted averaging coefficient (3), an intermediate value between the weighted averaging coefficient (1) and the weighted averaging coefficient (2) may be used as the coefficient. As to which of the weighted averaging coefficients should be adopted, it depends on the size of the smoothing area 18 and on a deviation of height between the laser reference plane RPa and the laser reference plane RPb.

FIG. 11 to FIG. 16 each represents an aspect of smoothing when the laser reference plane RPa and the laser reference plane RPb are tilted in various conditions. The selection of the aspect of the smoothing is determined by adequately selecting the weighted averaging coefficient in association with the operating conditions by the operator.

Next, in case the working area where the laser reference plane RPa can be used is entirely overlapped with the working area where the laser reference plane RPb can be used, i.e. when the invention is carried out under the condition that the entire working area can be covered by each one of the laser reference plane RPa or the laser reference plane RPb, and if the height positions obtained by the laser reference plane RPa and the laser reference plane RPb are calculated by the weighted averaging, the reference plane thus obtained will be approximately equal to the reference plane 19 (see FIG. 4). As a result, errors in the laser reference plane RPa and the laser reference plane RPb are offset, and a reference plane with higher accuracy can be acquired.

In the present invention, the laser reference plane may be formed by using three or more rotary laser devices. In this case, in an area where three or more laser reference planes are overlapped on each other, the smoothing processing as described above is carried out by selecting two of the laser reference planes.

INDUSTRIAL APPLICABILITY

According to the present invention, a surveying system, comprises a plurality of rotary laser devices, being installed at known points, for projecting a laser beam in rotary irradiation and for forming a laser reference plane respectively, a photodetecting device, being installed on a movable support member, for receiving the laser beam and for detecting a height of each of the laser reference planes at their photodetecting position, a coordinate position measuring device for detecting coordinate position of the support member, and a control device, wherein the rotary laser devices form the laser reference planes in such manner that at least a part of each effective range of the laser reference planes is overlapped on each other, the control device sets up a smoothing area within a range where the effective ranges are overlapped on each other, and in case the support member is judged to be within the smoothing area, based on a result of measurement by the coordinate position measuring device, the control device carries out smoothing processing of the laser reference plane continuously by the smoothing reference plane in the smoothing area based on the result of measurement by the coordinate position measuring device and also based on the result of detection by the photodetecting device. As a result, a plurality of laser reference planes can be formed, and even when error may be included between the laser reference planes, the laser reference planes can be changed over in smooth manner.

Further, according to the present invention, in the surveying system, the plurality of rotary laser devices project the laser beams identifiable from each other in rotary irradiation, and the photodetecting device can identify the laser beams individually. As a result, it is possible to prevent erroneous recognition of the reference planes when the laser reference planes are formed by a plurality of laser beams.

Further, according to the present invention, in the surveying system, the support member has a working implement in a known relation with the photodetecting device, and the control device controls a height of the working implement based on a result of the smoothing processing. As a result, when the reference planes are changed over in the operation using the working implement, the occurrence of a bump can be prevented.

Further, according to the present invention, in the surveying system, the control device calculates a deviation in height direction between the laser reference planes based on the result of detection by the photodetecting device, calculates a position of the support member within the smoothing area based on the result of measurement by the coordinate position measuring device, and calculates at real time the smoothing reference plane or smoothing reference position after the smoothing processing based on the calculated deviation of the height direction and also based on the calculated position within the smoothing area. As a result, even when the reference planes are changed in elapse of time, the smoothing processing can be carried out by including the changes.

Further, according to the present invention, in the surveying system, the control device calculates at real time the smoothing reference plane or the smoothing reference position by weighted averaging based on the deviation in height direction between the laser reference planes and also based on the position of the support member within the smoothing area. As a result, even when the reference planes are changed in elapse of time, the smoothing processing can be carried out by including the changes.

Further, according to the present invention, in the surveying system, a weighted averaging coefficient is included by giving consideration on smoothness in the calculation of the smoothing reference plane or the smoothing reference position of the control device. As a result, an optimal smoothing processing can be carried out by giving due consideration on deviation of height between the laser reference planes.

Further, according to the present invention, in the surveying system, in the rotary laser device, total range where at least two of the laser reference planes are overlapped is within an effective range of each of the laser reference planes. As a result, errors caused by two laser reference planes can be offset, and the reference planes with higher accuracy can be formed.

Furthermore, according to the present invention, a laser reference plane smoothing method in a surveying system comprises a step of forming a plurality of laser reference planes and of overlapping at least a part of effective range of the laser reference planes, a step of setting a smoothing area within the overlapped range, a step of detecting the laser reference planes respectively in the smoothing area and of obtaining a deviation in height between the laser reference planes, a step of detecting a coordinate position where light beams are detected within overlapped range, and a step of smoothly continuing the laser reference planes within the smoothing area based on the obtained deviation of height and on the detected coordinate position. As a result, it is possible to ensure smooth transition when the laser reference planes are changed over.

The invention claimed is:

1. A surveying system, comprising:
a plurality of rotary laser devices, being installed at known points, each for projecting a laser beam in rotary irradiation and for forming a respective laser reference plane having an effective range;
a photodetecting device, installed on a movable support member, for receiving said laser beams and for detecting a height of each of the respective laser reference planes at their photodetecting position;
a coordinate position measuring device for detecting coordinate position of said support member; and
a control device, wherein said rotary laser devices form said respective laser reference planes in such manner that at least a part of each effective range of said laser reference planes is overlapped with each other, wherein said overlapped references planes are not coplanar and a bump exists, which is created by a discontinuity in height between said overlapped reference planes in the overlapped range, and said control device sets up a smoothing area within a range where said effective ranges are overlapped with each other, and when said support member is judged to be within said smoothing area, based on a result of measurement by said coordinate position measuring device, said control device eliminates said bump by calculating a smoothing reference plane in said smoothing area based on the result of measurement by said coordinate position measuring device and also based on the result of detection by said photodetecting device, and connecting said overlapped laser reference planes using said smoothing reference plane.

2. A surveying system according to claim 1, wherein said plurality of rotary laser devices project said laser beams that are identifiable from each other in rotary irradiation, and said photodetecting device can identify said laser beams individually.

3. A surveying system according to claim 1, wherein said support member has a working implement in a known relation with said photodetecting device, and said control device controls a height of said working implement based on a result of the smoothing processing.

4. A surveying system according to claim 1, wherein said control device calculates a deviation in height direction between said respective laser reference planes based on the result of detection by said photodetecting device, calculates a position of said support member within said smoothing area based on the result of measurement by said coordinate position measuring device, and calculates in real time said smoothing reference plane or said smoothing reference position after the smoothing processing based on the calculated deviation of said height direction and also based on the calculated position within said smoothing area.

5. A surveying system according to claim 1 or claim 4, wherein said control device calculates in real time said smoothing reference plane or said smoothing reference position by weighted averaging based on the deviation in height direction between said respective laser reference planes and also based on the position of said support member within said smoothing area.

6. A surveying system according to claim 5, wherein a weighted averaging coefficient is included by giving consideration on smoothness in the calculation of said smoothing reference plane or said smoothing reference position of said control device.

7. A surveying system according to claim 1, wherein a working area is within the effective range of at least two of said respective laser reference planes.

8. A laser reference plane smoothing method in a surveying system, comprising:
forming a plurality of laser reference planes and overlapping at least a part of effective range of said laser reference planes, wherein said overlapped references planes are not coplanar and a bump exists, which is created by a discontinuity in height between said overlapped laser reference planes in the overlapped range,
setting a smoothing area within said overlapped range, detecting said laser reference planes respectively in said smoothing area and obtaining a deviation in height between said laser reference planes,
detecting a coordinate position where light beams are detected within overlapped range, and
eliminating said bump by smoothly continuing said laser reference planes within said smoothing area based on the obtained deviation of height and on the detected coordinate position.

\* \* \* \* \*